Patented Nov. 1, 1938

2,134,714

UNITED STATES PATENT OFFICE 2,134,714

SACCHARINE-ASPIRIN TABLET

Jacob A. Glassman, Chicago, Ill.

No Drawing. Application November 25, 1936, Serial No. 112,828

2 Claims. (Cl. 167—65)

The invention relates to a new medicated product, originally disclosed in my application Serial No. 13,318, filed March 27, 1935, of which this application is a continuation-in-part, having as its active ingredient, acetyl salicylic acid (aspirin) and having incorporated therein saccharine, as its after-taste preventing and synergistic ingredient, as well as an odoriferous agent.

Acetyl salicylic acid is of considerable analgesic, anti-pyretic, and anti-rheumatic value but it possesses a very acidulous taste which, when realized by the highly sensitive taste-bud nerve endings of the tongue, leaves a very disagreeable acrid "after-taste" which persists in the buccal cavity and throat for from ten to thirty minutes after the aspirin has been completely consumed.

Hitherto acetyl salicylic acid has been prescribed or sold in simple tablet form with no attempt whatever being made to render it palatable and attractive for those individuals who find it extremely difficult and sometimes impossible to swallow medicinal tablets in the usual manner. Such tablets often are necessarily swallowed with the aid of a full glass of water but, for reasons to be made apparent hereinafter, this method is extremely objectionable. Prior known efforts to overcome the disagreeable "after-taste" have resulted in the mixing of sugar (sucrose) with the acetyl salicylic acid but, because ordinary sugar possesses a water solubility of 1 to 0.5, (thus is decidedly more soluble than aspirin which has a water solubility of 1 to 300) it is wholly inferior and impractical principally for the following reasons:

Acetyl salicylic acid is one of the very few active drugs that is absorbed in any appreciable quantity from the gastric mucosa, whereas ordinary sugar, being a di-saccharide, can only be absorbed from the intestinal mucosa, a great distance away from the stomach, because it must be acted upon by the intestinal juices and hydrolyzed into two molecules of mono-saccharides before absorption can occur. During the mastication of a sugar-aspirin tablet, the highly soluble sugar goes rapidly into solution with the saliva and is repeatedly swallowed reflexly, carrying down with it small portions of the much less soluble aspirin particles in a very viscid syrupy suspension.

In the continued process of mastication and swallowing much of the aspirin is still undissolved and more and more acetyl salicylic acid remains on the sensitive taste-bud nerve endings of the tongue, unopposed by the already swallowed sugar. When the aspirin finally gets into solution, with hardly any sugar to mask its taste on the tongue, a very acidulous taste is realized which continues to persist for from ten to thirty minutes after the complete consumption of the tablet. Consequently sugar, even in large amounts, does not actually mask the bitter aspirin taste.

Because most of the viscid syrupy sugar solution formed carries with it only a small part of the aspirin in solution and the greater part in suspension, complete absorption of the aspirin from the stomach and duodenum is prevented. It is only after the sugar solution with the suspended particles of acetyl salicylic acid reaches a more distal portion of the small intestines and complete splitting up of sucrose to two molecules of mono-saccharides has taken place and the aspirin particles have gone into complete solution, that absorption of the active drug takes place. During this great delay of absorption an appreciable quantity of the acetyl salicylic acid has already become hydrolyzed into salicylic acid and acetic acid, thus preventing the desired action of the dosage administered. The long delay of an entire sugar-aspirin tablet going into solution, the delay in absorption-time and the diminished amount of aspirin finally absorbed are directly responsible for delay in relief of symptoms.

Because the value of sugar as a sweetening agent is extremely low, a sugar-aspirin tablet further is impractical and prohibitive in size, and ineffective, as well as extremely harmful to persons suffering from such disabilities as are aggravated by the addition of any quantity of sugar to the blood stream. Several of the conditions in which the addition of even small quantities of sugar to the blood stream produce harmful and at times even dangerous effects, are diabetes mellitus, fermentative dyspepsia, gout and controlled obesity.

For the purpose of rendering aspirin less disagreeable to administer in tablet or lozenge form without the aid of a full glass of water, research has long been carried on, as a result of which a suitable ingredient has now been found making it possible not only to sweeten, mask, and prevent the undesirable "after-taste" of acetyl salicylic acid, but also to cause said drug to be immediately absorbed and bring about rapid relief of obnoxious symptoms, without endangering the condition of persons suffering from disabilities which are aggravated by the addition of sugar to the blood stream.

It is, therefore, an object of this invention to provide, in an aspirin product, a suitable amount of an ingredient which will practically and conveniently permit mastication of a tablet or lozenge without either causing one to experience the aciduous taste of aspirin or the lingering acrid "after-taste".

Another object is to provide an aspirin product with an ingredient which will act as a synergistic agent to the aspirin in such a way that absorption of the aspirin will occur immediately and completely.

Another object is to provide an improved aspirin product in tablet or lozenge form, which may be taken by diabetics and rheumatics without harmful or dangerous results.

Another object is to provide an aspirin product, in tablet or lozenge form, which may be conveniently and easily masticated and swallowed without the aid of water.

Another object is to provide an aspirin product with an ingredient which greatly stimulates the gastric and duodenal mucosae and increases the rate of absorption.

The masking, "after-taste" preventing, and mucosal stimulating action is obtained by the addition, to aspirin, of saccharine (benzosulphinide) or soluble saccharine (sodium benzosulphinide) or any derivative, mixture or compound thereof. Compounding of the two ingredients may be either accomplished by a moist or dry process. Because dry saccharinization process is the more rapid, it is preferable, although the moist method has certain advantages. In the process of moist saccharinization, the acetyl salicylic acid is impregnated with an alcoholic solution of saccharine which may vary in strength from a 1% to 5% solution or over. The alcoholic solution then is permitted to evaporate.

Coloring or aromatic agents, in suitable quantities may be employed to render the saccharine-aspirin tablet or lozenge more attractive. Among some of the various ingredients or accessory agents that may be employed in the saccharine-aspirin product are:

1. Odoriferous agents; any tincture, elixir, or spirit; such as tincture of vanilla, spirit of peppermint, wintergreen, clove, etc.

2. Coloring agents; cocoa powder, carmine, cudbear, etc.

Known lubricant agents may be also employed to render the saccharine-aspirin mixture more easily compressible into tablet form and aid the latter to be expelled from the tablet forming machine. Such a suitable agent is found in a "starch-fat" compound, which consists of starch and triturated oil or liquid petrolatum in proportions varying from 1 to 2 to 1 to 4, respectively, and which may be sweetened with an alcoholic solution of saccharine, the alcohol being evaporated off.

Before entering into a discussion of the specific composition of the improved saccharine-aspirin product a comparative discussion of the advantages thereof as distinguished from a sugar-aspirin or aspirin tablet follows:

It is well known that the excessive exposure of acetyl salicylic acid (aspirin), to water, causes it to hydrolyze rapidly, with the production of undesirable salicylic acid and acetic acid, and consequent aciduous after-taste. Therefore, contrary to the known practice of providing a tablet in which water is necessary in swallowing, the improved product of the present invention can be thoroughly masticated without experiencing an aciduous taste or acrid "after-taste" and then swallowed without the aid of water. This procedure assures an increased rate of absorption of undissociated acetyl salicylic acid and rapid relief of obnoxious symptoms.

Saccharine's chemical characteristics make it the ideal synergistic substance to acetyl salicylic acid for the various uses herein described Saccharine's solubility in water is 1 in 290, while, as previously noted, sugar is soluble in water 1 in 0.5 and acetyl salicylic acid is soluble in water to the extent of 1 in 300. (See Useful Drugs, 8th ed. 1930, published by American Medical Association, pages 8, 83 and 144). The substantially identical solution of saccharine and aspirin permits either slow or rapid pleasant mastication of the improved tablet or lozenge, and facilitates more rapid absorption of the active drug because an earlier solution of aspirin is obtained.

Saccharine, being synthetic and chemically and therapeutically different than ordinary sugar, is more than five hundred times sweeter, non-fermentable, and non-nutritive and also serves as a gastric and intestinal juice stimulating agent. Saccharine permits the addition of the required amount of "taste-masking," "after-taste" preventing, and mucosal stimulating quantities whereby a practical and palatable tablet is made possible.

It is now established that absorption to an appreciable extent occurs in the oral cavity, and therefore, since the use of saccharine makes it possible to masticate the tablet without producing a lingering disagreeable taste, the aspirin enters into solution with the salivary secretions and some absorption occurs in the mouth. The remainder of the active drug is quickly and completely absorbed after swallowing, via the gastric and duodenal mucosae. When the solution of aspirin and saccharine reaches the stomach and duodenum, the saccharine, being a potent irritant, stimulates the mucosa and induces a greater formation of gastric and intestinal juices. It also produces a diffuse vascular hyperemia and capillary engorgement which further facilitates more rapid absorption with immediate eradication of obnoxious symptoms. This is because absorption is in direct ratio to the rapidity and amount of blood perfusion in the part, and irritant or stimulating substances (i. e. saccharine) which produce hyperemia by increasing the blood supply to the stomach and duodenal mucosae, favor and facilitate immediate absorption of the active principle, namely; acetyl salicylic acid.

The presence of saccharine in the saccharine-aspirin tablet permits said tablet to be masticated or swallowed whole without the aid of water, hence dilution of the acetyl salicylic acid is avoided. Since greater mucosal absorption occurs only when the concentration of the drug is increased, aspirin absorption from the gastric and duodenal mucosae is greatly enhanced. Inasmuch as the use of cold or even cool water to aid swallowing of an aspirin tablet causes a vasoconstricting effect of the mucosal capillaries of the stomach and intestine, which decreases the blood supply and markedly diminishes and even hinders absorption of the active drug, dissolution and swallowing of the saccharine-aspirin tablet of the present invention without the aid of water further increases the rate of absorption. Accordingly, because earlier and complete solution of the improved tablet is obtained without the aid of water and because the saccharine stimulates vascular engorgement of the mucosal capillaries, immediate absorption of the active drug occurs, with prompt amelioration of obnoxious symptoms. These are results not obtained by the use of any starch or sugar, and are additional to its previously mentioned taste-masking and after-taste preventing characteristics.

Since saccharine has almost the same water solubility property as aspirin, both go into solution at practically the same time during the process of mastication. However, due to the slight difference in solubility, (saccharine being slightly more readily soluble than aspirin) the saccharine stimulates the sensitive taste-bud nerve endings in the papillae of the tongue with the primary and desired sweet sensation which serves to mask the acidulous taste of the acetyl salicylic acid and thus prevents its very disagreeable acrid "after-tastes" which persists very long after the complete consumption of aspirin when the latter is taken alone.

The taste bud nerve endings of the tongue are so intensely stimulated that no other ordinary or even extraordinary acrid substance can stimulate these partially and temporarily paralyzed taste buds for from ten to thirty minutes thereafter. It is during this interval of temporary insensitiveness of the taste buds to other substances that most all of the acetyl salicylic acid is pleasantly swallowed with the aid of the saliva, and absorbed from the gastric and duodenal mucous membrane.

The tablet of the present invention is a new line of approach in the therapeutics for patients in whom starch, sugar, or any other saccharide can not be tolerated or is entirely contraindicated. Saccharine, unlike sugar, is an absolute non-nutritive ingredient producing its highly desirable effects chemically and excreted via the kidneys chemically unchanged. None of the saccharine is utilized from the blood stream, hence diabetics and those who are consistently suffering from acute articular rheumatism and who require large dosages of acetyl salicylic acid are not affected or harmed by its use when mixed with saccharine. In these individuals, the addition of slight amounts of sugar to a blood stream already overburdened with excessive sugar content would cause untold harm which could result in extreme restlessness, irritability, and even coma.

The three following composition formulae are stated only in approximate weights and proportions and by way of example for the manufacture of 100 saccharine-aspirin tablets, with the dosage of the aspirin varying from 1 to 5 grains. It is apparent that the dosage of the active drug ingredients can be increased or decreased, and that the amounts of the accessory agents previously referred to can be increased or decreased within reasonable limits or wholly omitted to effect the desired color, odor, size, or shape of the product.

The following is an approximate composition formula for the manufacture of 100 saccharine-aspirin tablets, each tablet containing a 1 grain dose of aspirin.

| | |
|---|---|
| Acetyl salicylic acid_____gms__ | 6.60 |
| Saccharine_____gms__ | 0.15 |
| Fat-starch_____gms__ | 2.00 |
| Tincture of vanilla_____cc__ | 2.00 |

The following is an approximate composition formula for the manufacture of 100 saccharine-aspirin tablets, each tablet containing a 3 grain dose of aspirin.

| | |
|---|---|
| Acetyl salicylic acid_____gms__ | 20.00 |
| Saccharine_____gms__ | 0.50 |
| Fat-starch_____gms__ | 4.00 |
| Tincture of vanilla_____cc__ | 4.00 |

The following is an approximate composition formula for the manufacture of 100 saccharine-aspirin tablets, each tablet containing a 5 grain dose of aspirin.

| | |
|---|---|
| Acetyl salicylic acid_____gms__ | 33.33 |
| Saccharine_____gms__ | 0.90 |
| Fat-starch_____gms__ | 6.00 |
| Tincture of vanilla_____cc__ | 8.00 |

The addition of dehydrated starch, potato starch, or corn starch imparts to the tablet greater powers of disintegration, therefore, it may be incorporated in suitable proportions. If the tablet tends to split, the addition of more fat-starch in proportions of 10% or over will prevent it.

It is to be understood that such substances as spices, saponins, and lipophil bodies may be also added in varying proportions for their similar irritant properties to saccharine, namely, gastric mucosal stimulating with resultant vascular hyperemia, because in certain instances the further addition of saccharine would tend to render the product too sweet to be ideally palatable.

Although it is thought to be most practical to employ the saccharine-aspirin product in tablet form, it must be understood that it may also be put up in capsule, lozenge or powder form in the approximate proportions as outlined above.

The terms used herein are employed in the special senses indicated: "lubricant", designates substance which would further aid in the compression of a mere tablet; and "odoriferous agent", designates any suitable substance which would impart an odor to the finished product.

I claim:

1. A composition of matter comprising approximately 40 parts by weight of acetyl salicylic acid and 1 part by weight of saccharine.

2. A composition of matter consisting essentially of acetyl salicylic acid in therapeutic quantity and saccharine in quantity greatly less than that of the acetyl salicylic acid yet sufficient to mask the taste and to increase the rate of absorption of the acetyl salicylic acid.

JACOB A. GLASSMAN.